US012308151B2

(12) United States Patent
Liu et al.

(10) Patent No.: US 12,308,151 B2
(45) Date of Patent: May 20, 2025

(54) COMMON MODE CHOKE

(71) Applicant: Delta Electronics, Inc., Taoyuan (TW)

(72) Inventors: Chia-Ming Liu, Taoyuan (TW); Wen-Yu Huang, Taoyuan (TW); Lei Ren, Taoyuan (TW); Rui-Guang Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 521 days.

(21) Appl. No.: 17/376,814

(22) Filed: Jul. 15, 2021

(65) Prior Publication Data

US 2022/0367102 A1 Nov. 17, 2022

(30) Foreign Application Priority Data

May 14, 2021 (CN) ........................ 202110528884.8

(51) Int. Cl.
*H01F 27/28* (2006.01)
*H01F 17/00* (2006.01)
*H01F 17/02* (2006.01)

(52) U.S. Cl.
CPC ............. *H01F 17/02* (2013.01); *H01F 27/28* (2013.01); *H01F 2017/0093* (2013.01)

(58) Field of Classification Search
CPC .. H01F 17/02; H01F 27/28; H01F 2017/0093; H01F 17/062; H01F 27/2828
USPC .......................................................... 336/221
See application file for complete search history.

(56) References Cited

U.S. PATENT DOCUMENTS 4,814,735 A * 3/1989 Williamson ........ H01F 27/2847 336/182
4,833,437 A * 5/1989 Williamson ............ H01F 37/00 336/83
4,901,048 A * 2/1990 Williamson ............ H01F 30/16 336/229
10,607,767 B2 * 3/2020 Fan ....................... H01F 27/292
11,177,066 B2 * 11/2021 Hatol ....................... H05K 1/18
2008/0012675 A1 * 1/2008 Brunel .................... H01F 37/00 336/212
2014/0152414 A1 * 6/2014 Kawashima .......... H01F 41/071 336/192
2019/0066896 A1 * 2/2019 Gwadera ................. H01F 27/29
2019/0287713 A1 * 9/2019 Kawashima ............ H01F 27/30
2021/0012948 A1 * 1/2021 Francis ............... H01F 27/2804
2021/0012951 A1 * 1/2021 Francis ................. H01F 27/425

(Continued)

FOREIGN PATENT DOCUMENTS

CN 201845650 U * 5/2011
CN 102629513 A * 8/2012
CN 206976142 U * 2/2018

(Continued)

*Primary Examiner* — Shawki S Ismail
(74) *Attorney, Agent, or Firm* — Muncy, Geissler, Olds & Lowe, P.C.

(57) ABSTRACT

A common mode choke is provided, including a hollow ferrite core, a plurality of coils wound around the ferrite core, and a substrate. Each of the coils has a first end and a second end. The substrate is disposed on the side of the ferrite core and has a plurality of through holes. The first and second ends of the coils are engaged in the through holes. When viewed along the central axis of the ferrite core, the first and second ends of the coils are located on the outer side the ferrite core.

9 Claims, 11 Drawing Sheets

(56) References Cited

U.S. PATENT DOCUMENTS

| | | | | |
|---|---|---|---|---|
| 2021/0012952 | A1* | 1/2021 | Francis | H01F 17/062 |
| 2023/0386730 | A1* | 11/2023 | Liu | H01F 27/303 |

FOREIGN PATENT DOCUMENTS

| | | | | | |
|---|---|---|---|---|---|
| CN | 207529762 | U | * | 6/2018 | |
| CN | 117153534 | A | * | 12/2023 | H01F 27/24 |
| DE | 202020104578 | U1 | * | 12/2020 | H01F 17/062 |

* cited by examiner

COMMON MODE CHOKE

CROSS REFERENCE TO RELATED APPLICATIONS

This Application claims priority of China Patent Application No. 202110528884.8 filed on May 14, 2021, the entirety of which is incorporated by reference herein.

BACKGROUND OF THE INVENTION

Field Of The Invention

The application relates in general to a common mode choke, and in particular, to a common mode choke that has a short conductive path.

Description Of The Related Art

Inductors have been widely applied in the field of power electronic circuits. Moreover, due to the high switching frequency of the power circuits or electromagnetic relays in the industrial control equipment, Electro Magnetic Interference (EMI) remains a serious problem. Therefore, various EMI filters have been provided to suppress differential-mode and common-mode noise to meet the electrical specifications.

A common mode choke is one of the solutions that have been used to suppress EMI. In a traditional common mode choke, the circuits on a PCB are electrically connected to the coils wound around a ferrite core, wherein the ends of each coil are respectively located on the inner and outer sides of the ferrite core, thus increasing the difficulty of laying out the circuitry of the PCB. Moreover, the efficiency of the common mode choke can be reduced since it has a long and complex conductive path.

Therefore, addressing the aforementioned problems has become a challenge.

BRIEF SUMMARY OF INVENTION

A common mode choke is provided, including a hollow ferrite core, a plurality of coils wound around on the ferrite core, and a substrate. Each of the coils has a first end and a second end. The substrate is disposed on the side of the ferrite core and has a plurality of through holes. The first and second ends of the coils are engaged in the through holes. When viewed along the central axis of the ferrite core, the first and second ends of the coils are located on the outer side the ferrite core.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the common mode choke are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
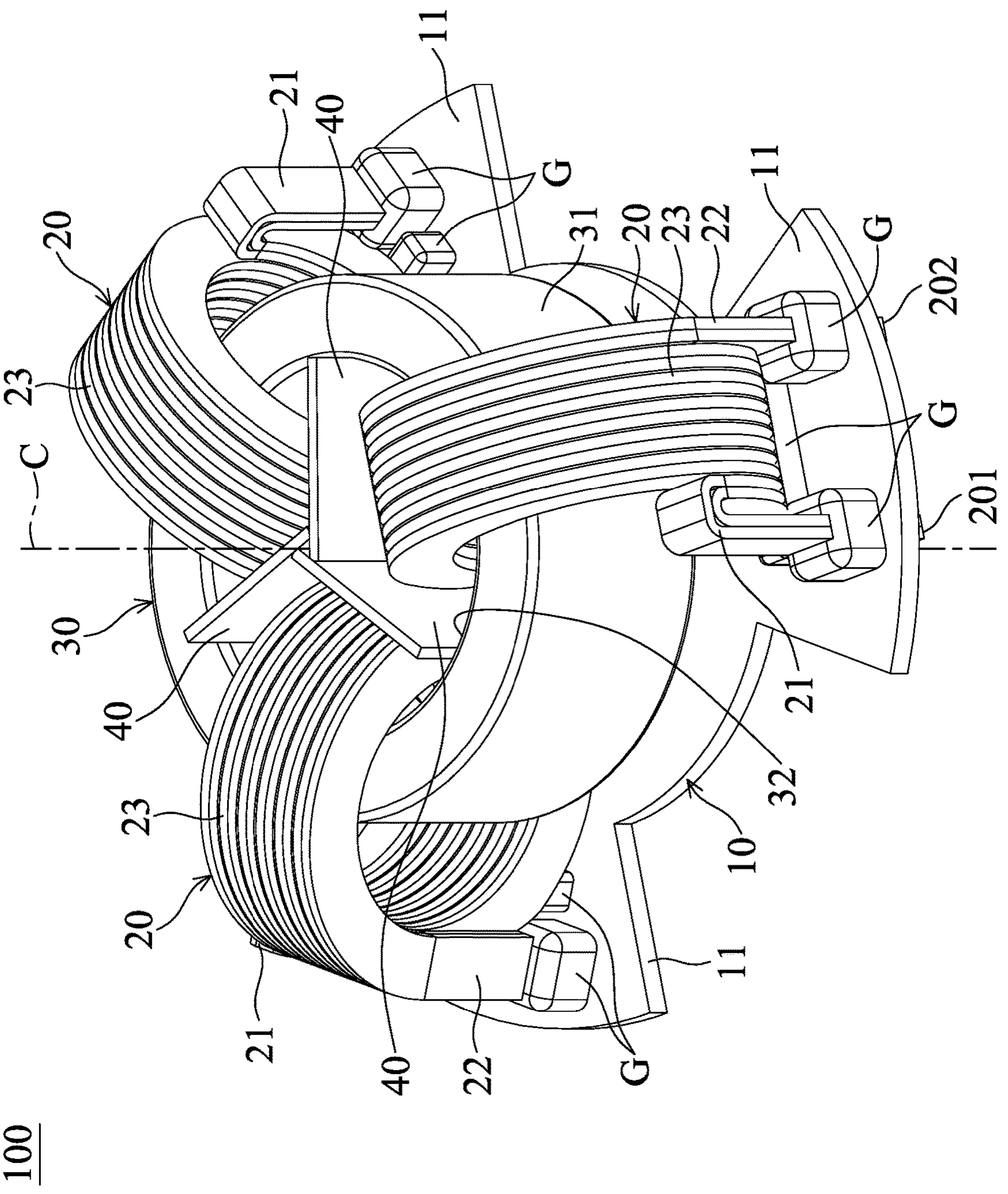
FIG. 1 is a perspective diagram of a common mode choke 100 according to an embodiment of the invention.
Figure 2:
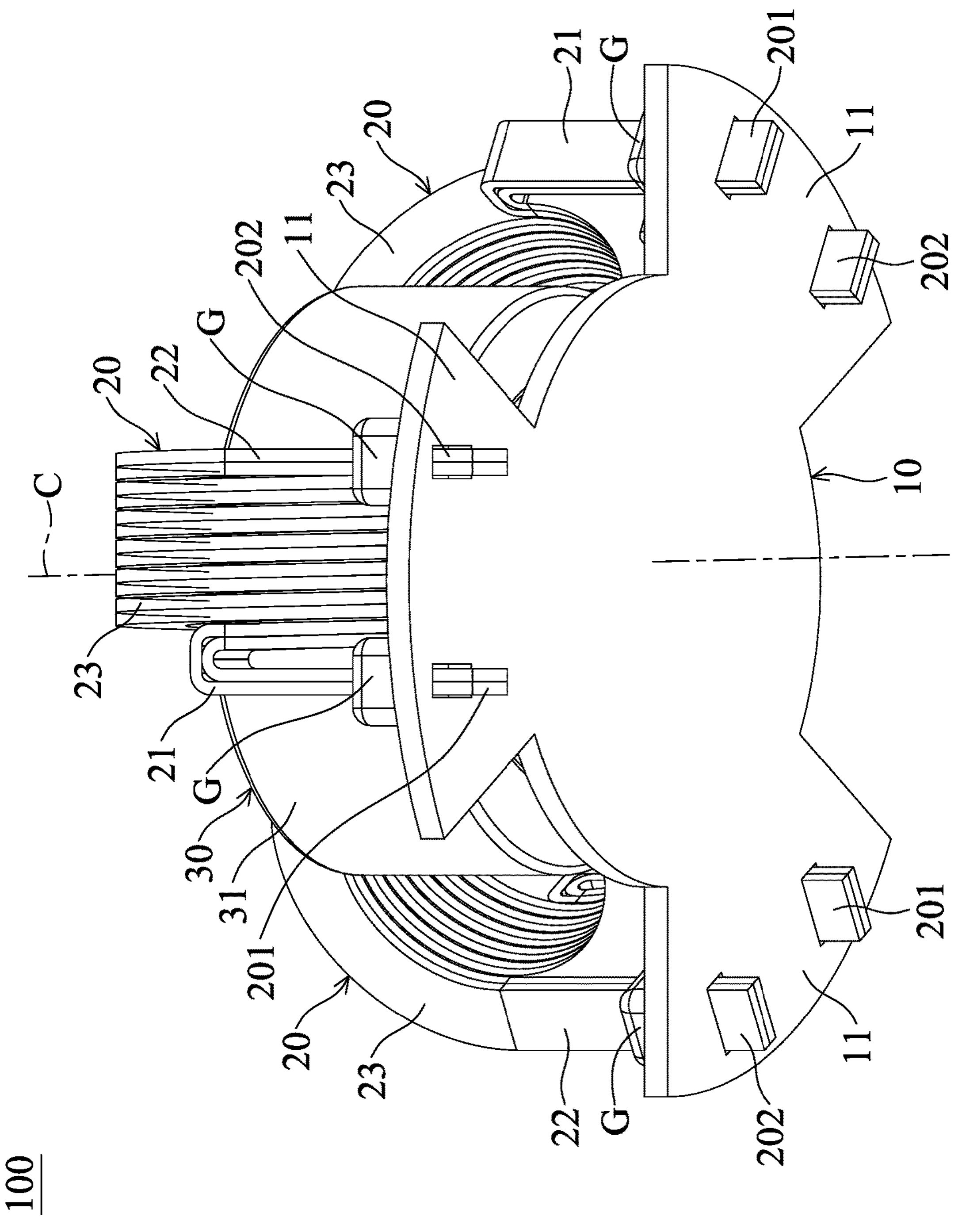
FIG. 2 is another perspective diagram of the common mode choke 100 in FIG. 1.

FIG. 1 is a perspective diagram of a common mode choke 100 according to an embodiment of the invention. FIG. 2 is another perspective diagram of the common mode choke 100 in FIG. 1.

Referring to FIGS. 1 and 2, an embodiment of a common mode choke 100 may be disposed in a power electronic circuit system of an industry computer or control equipment, so as to suppress noise signal and the EMI. The common mode choke 100 primarily comprises a substrate 10 (e.g. bakelite board or PCB), several coils 20, a hollow core 30, and several insulating sheets 40. In this embodiment, there are three coils 20. However, there may be more than three coils 20, or there may be two coils 20, and it is not limited to the particular embodiments of the invention.

As shown in FIGS. 1 and 2, the core 30 has an annular main body 31 and an opening 32 extending through the main body 31. The coils 20 are disposed through the opening 32 and wound around on the main body 31. Specifically, each of the coils 20 has a first extending portion 21, a second extending portion 22, and a winding portion 23. The first extending portion 21 connects the winding portion 23 with a first end 201 of the coil 20. The second extending portion 22 connects the winding portion 23 with a second end 202 of the coil 20, wherein the winding portion 23 is wound around the main body 31 of the core 30.

The substrate 10 is disposed below the core 30, and the insulating sheets 40 are disposed in the opening 32 and arranged in a radial manner. Specifically, the coils 20 are located between the insulating sheets 40, so that short circuit between the coils 20 can be prevented. Moreover, the coils 20 penetrate the substrate 10 after assembly of the common mode choke 100, wherein the first and second extending portions 21 and 22 protrude from the bottom surface of the substrate 10 (FIGS. 1 and 2). In this embodiment, glue G can be disposed between the substrate 10 and the first and second extending portions 21 and 22 of each coil 20. Additionally, glue G can also be disposed between the substrate 10 and the winding portion 23 of each coil 20, thereby enhancing the connection strength of the coils 20 and the substrate 10.

Figure 3:
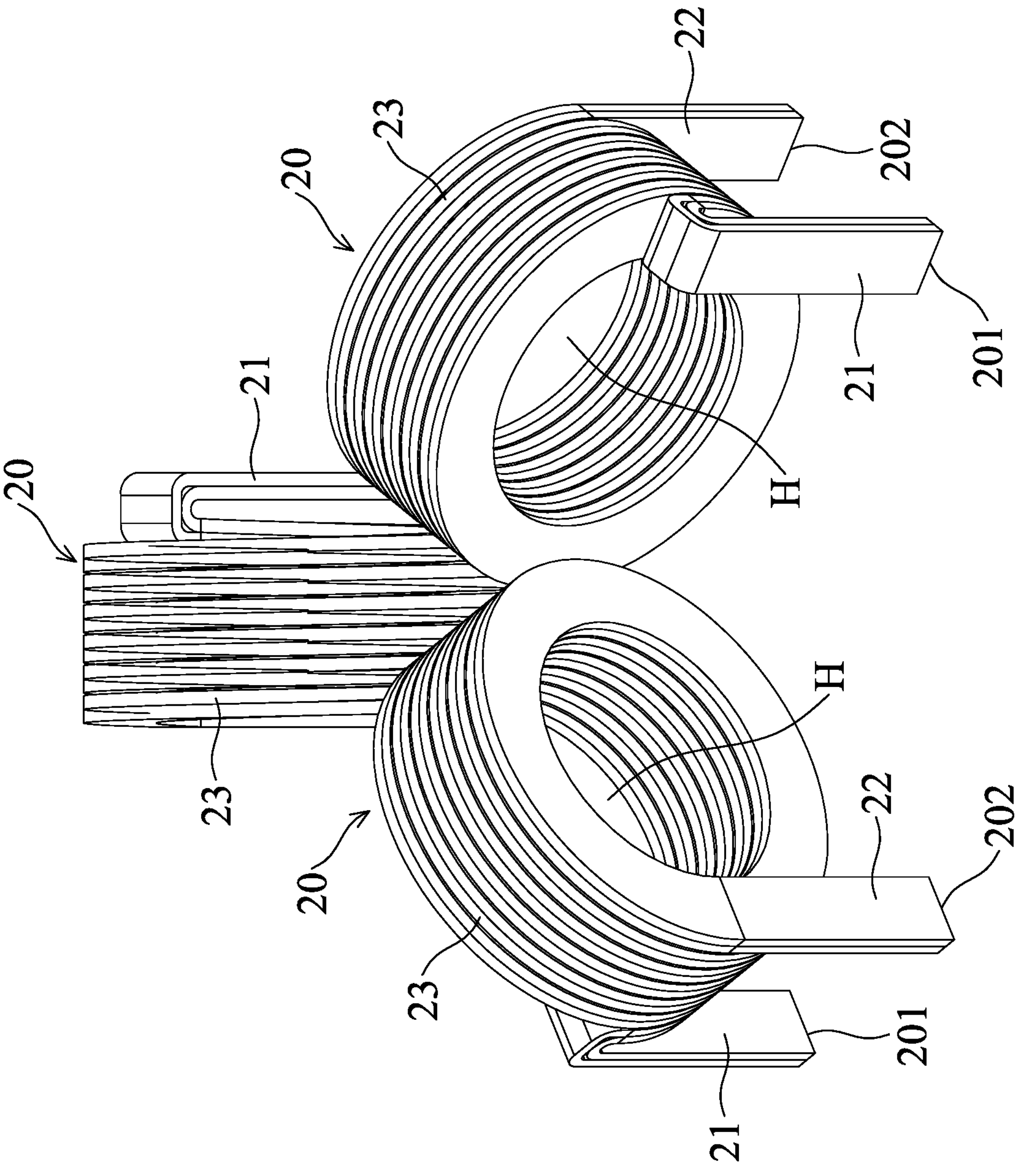
FIG. 3 is a perspective diagram of the three coils 20 in FIGS. 1 and 2.
Figure 4:
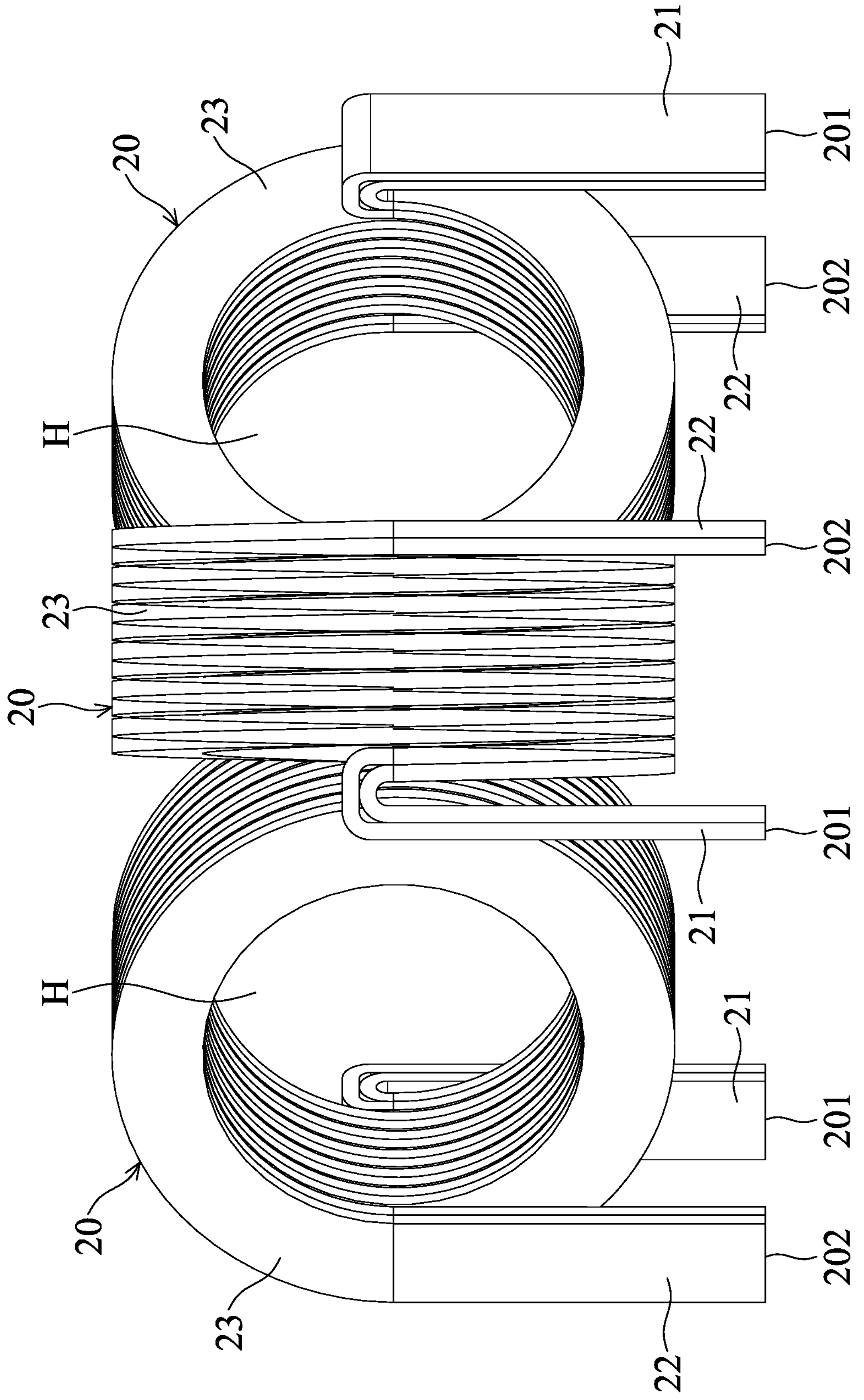
FIG. 4 is a side view of the three coils 20 in FIGS. 1 and 2.
Figure 5:
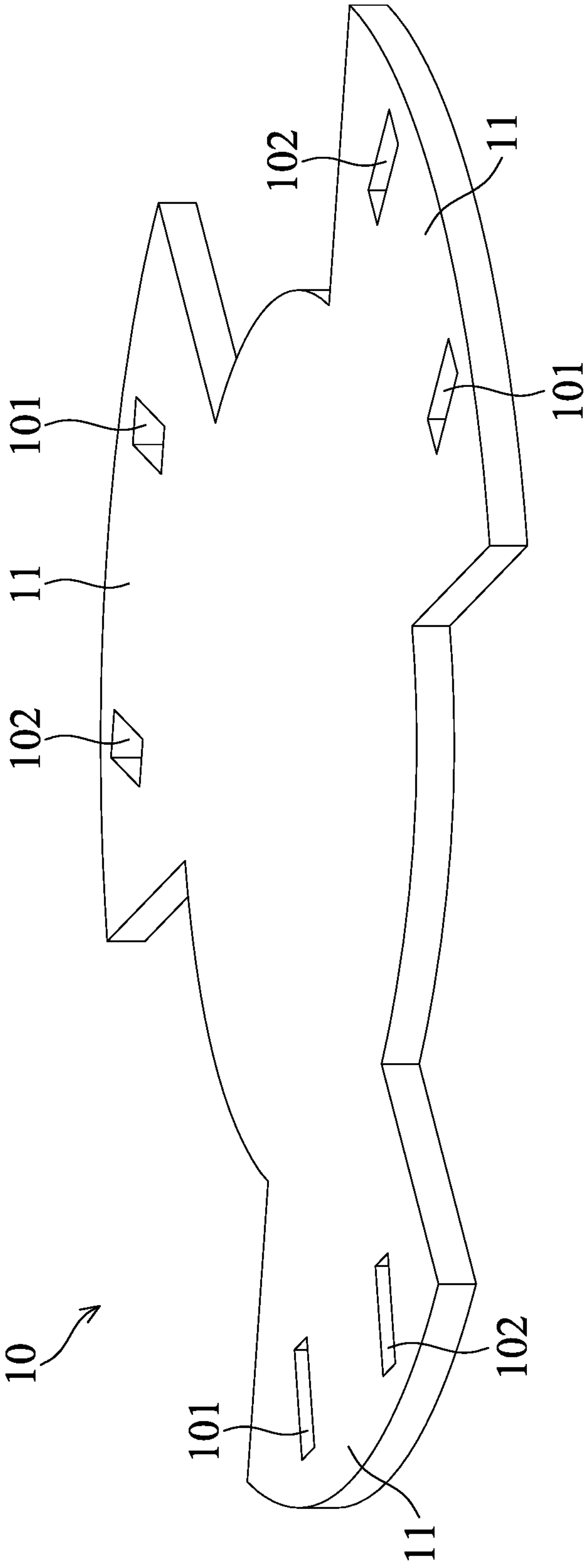
FIG. 5 is a perspective diagram of the substrate 10 in FIGS. 1 and 2.

FIG. 3 is a perspective diagram of the three coils 20 in FIGS. 1 and 2. FIG. 4 is a side view of the three coils 20 in FIGS. 1 and 2. FIG. 5 is a perspective diagram of the substrate 10 in FIGS. 1 and 2.

As mentioned above, each of the coils 20 has a first extending portion 21, a second extending portion 22, and a winding portion 23. Referring to FIGS. 3 and 4, the winding portion 23 has a hole H through which the main body 31 of the core 30 extends. Specifically, the first extending portion 21 has a curved structure to connect the winding portion 23 with the first end 201 of the coil 20. The second extending portion 22 has a longitudinal structure extending in a vertical direction, so as to connect the winding portion 23 with the second end 202 of the coil 20.

As shown in FIG. 5, the substrate 10 forms three protrusions 11 arranged in a radial manner. Each of the protrusions 11 has two through holes, and two electrical pads 101 and 102 are respectively disposed in the through holes. During assembly of the coils 20 and the substrate 10, the first and second ends 201 and 202 penetrate the substrate 10 via the through holes and electrically connect to electrical pads 101 and 102, respectively. In this embodiment, the first and second ends 201 protrude from the bottom surface of the substrate 10 (FIGS. 1 and 2).

Here, there are three protrusions 11, and each of them has a fan-shaped structure. In some embodiments, there may be more than three protrusions 11, or there may be two protrusions 11, as long as they correspond to the number of coils 20, in some embodiments, the substrate 10 may have a large, round structure without protrusions 11. The shape and number of protrusions 11 are not limited to the particular embodiments of the invention.

Figure 6:
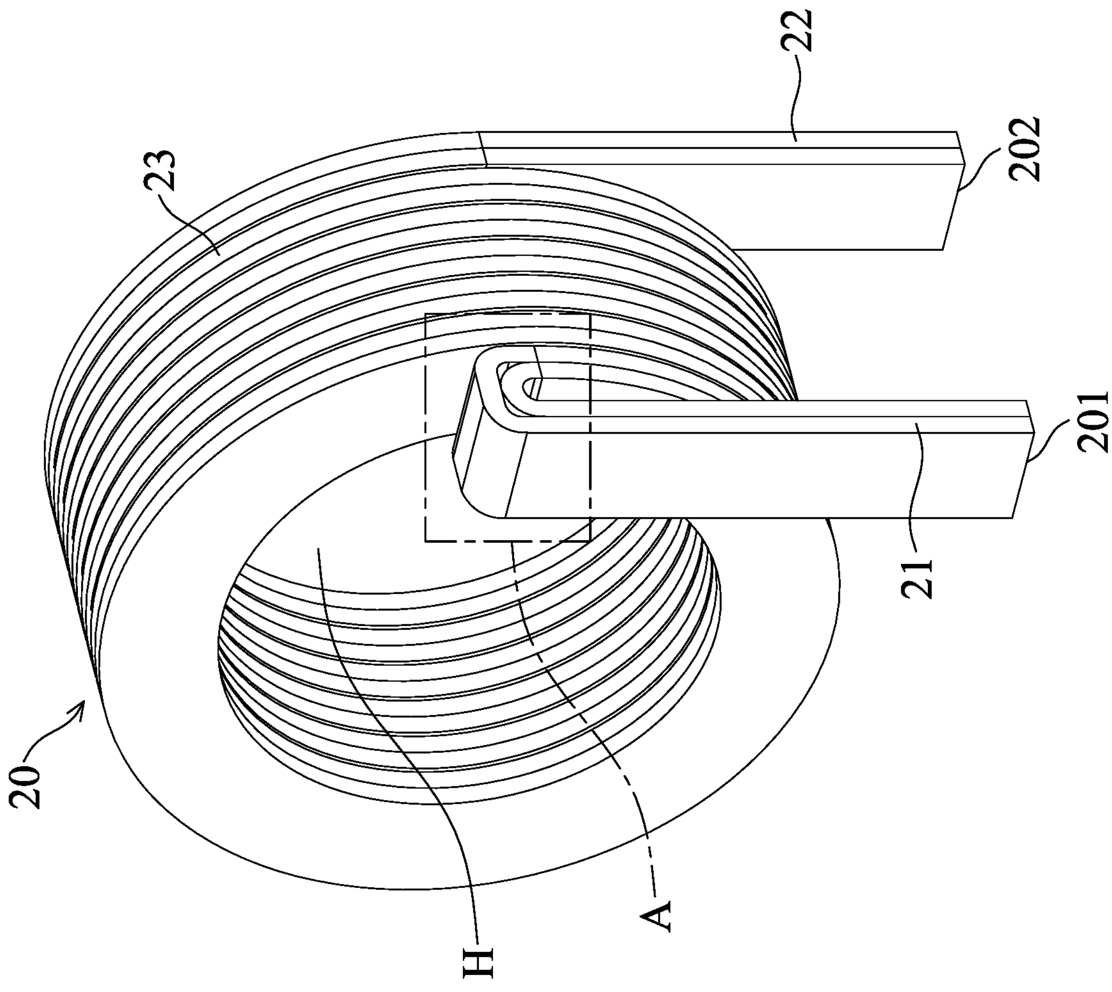
FIG. 6 is a perspective diagram of one of the coils 20 in FIGS. 3 and 4.
Figure 7:
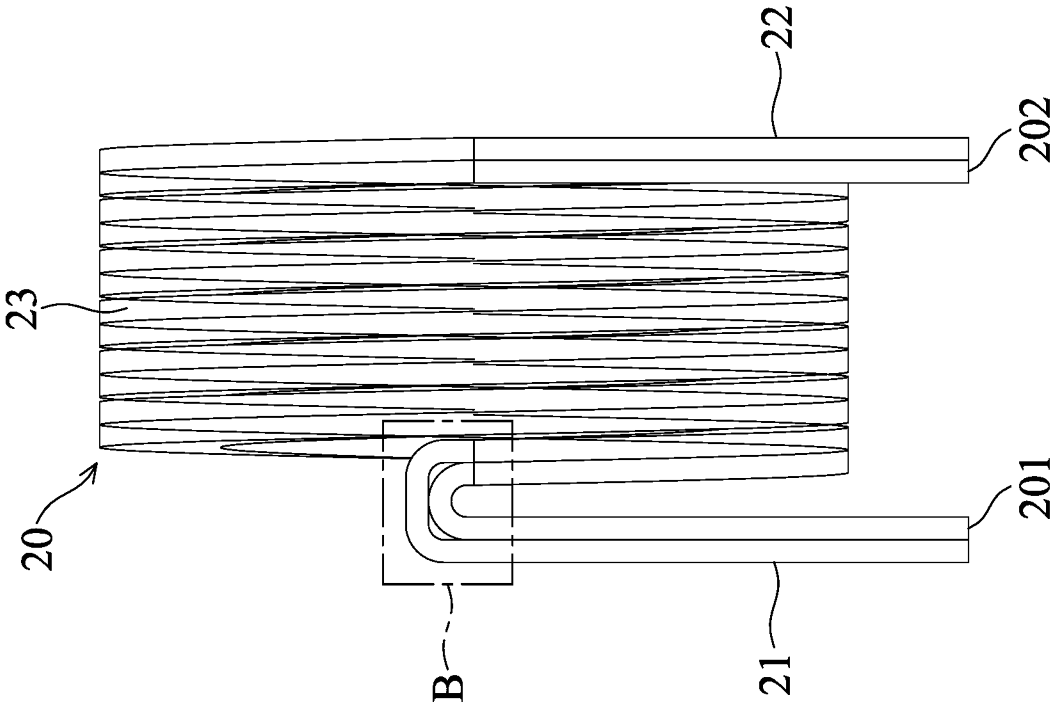
FIG. 7 is a side view of the coil 20 in FIG. 6.

FIG. 6 is a perspective diagram of one of the coils 20 in FIGS. 3 and 4. FIG. 7 is a side view of the coil 20 in FIG. 6.

As the portions A and B show in FIGS. 6 and 7, the first extending portion 21 of the coil 20 has a U-shaped structure, the second extending portion 22 has a longitudinal structure extending in a vertical direction, and the winding portion 23 has a hole H. After assembly of the common mode choke 100, the main body 31 of the core 30 extends through the holes H of the winding portions 23. In this embodiment, the first extending portion 21 forms a U-shaped structure that extends away from the winding portions 23 and turns in a direction parallel to the substrate 10 and then turns back in a direction toward the substrate 10.

Figure 8:
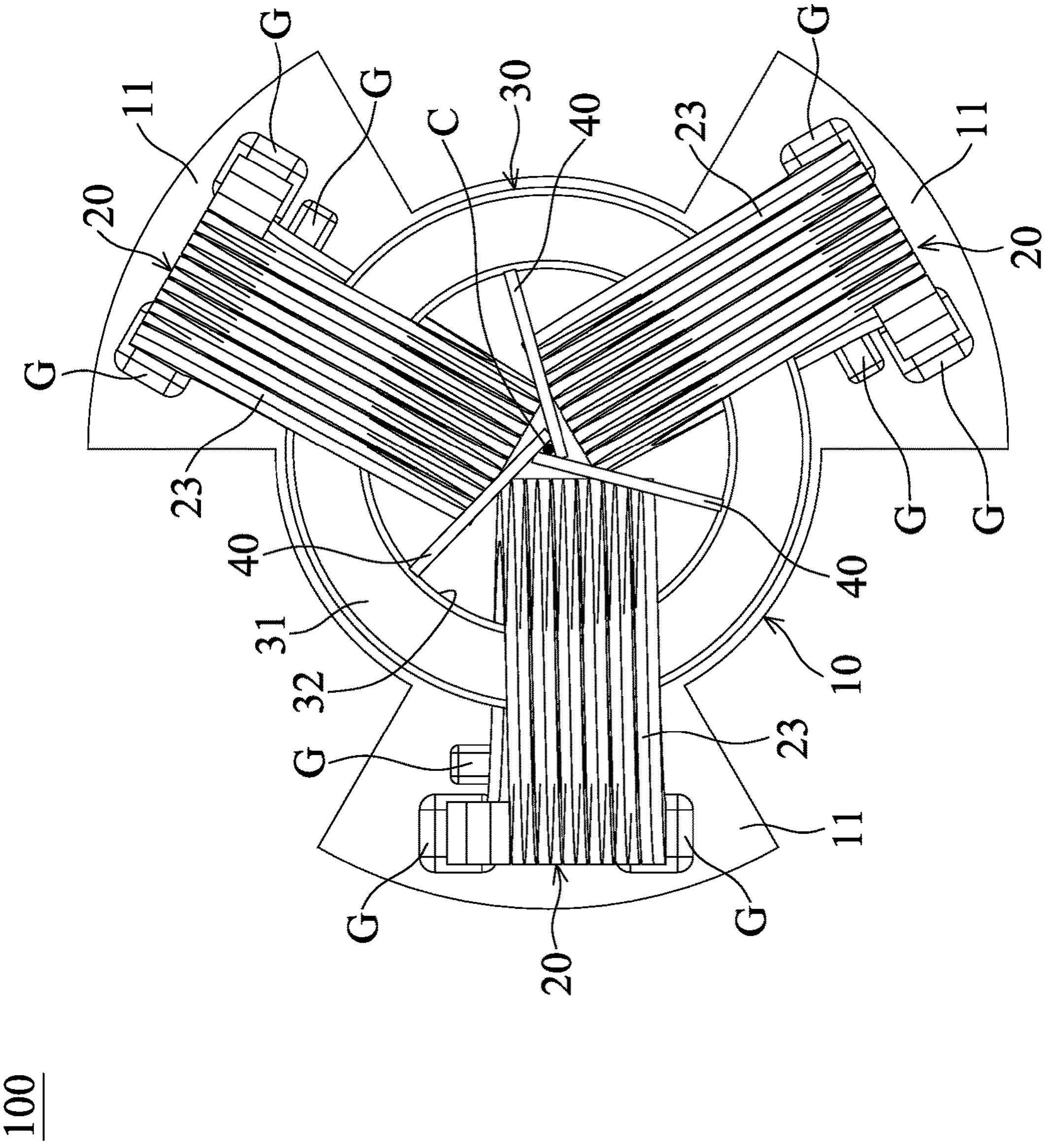
FIG. 8 is a top view of the common mode choke 100 in FIGS. 1 and 2.
Figure 9:
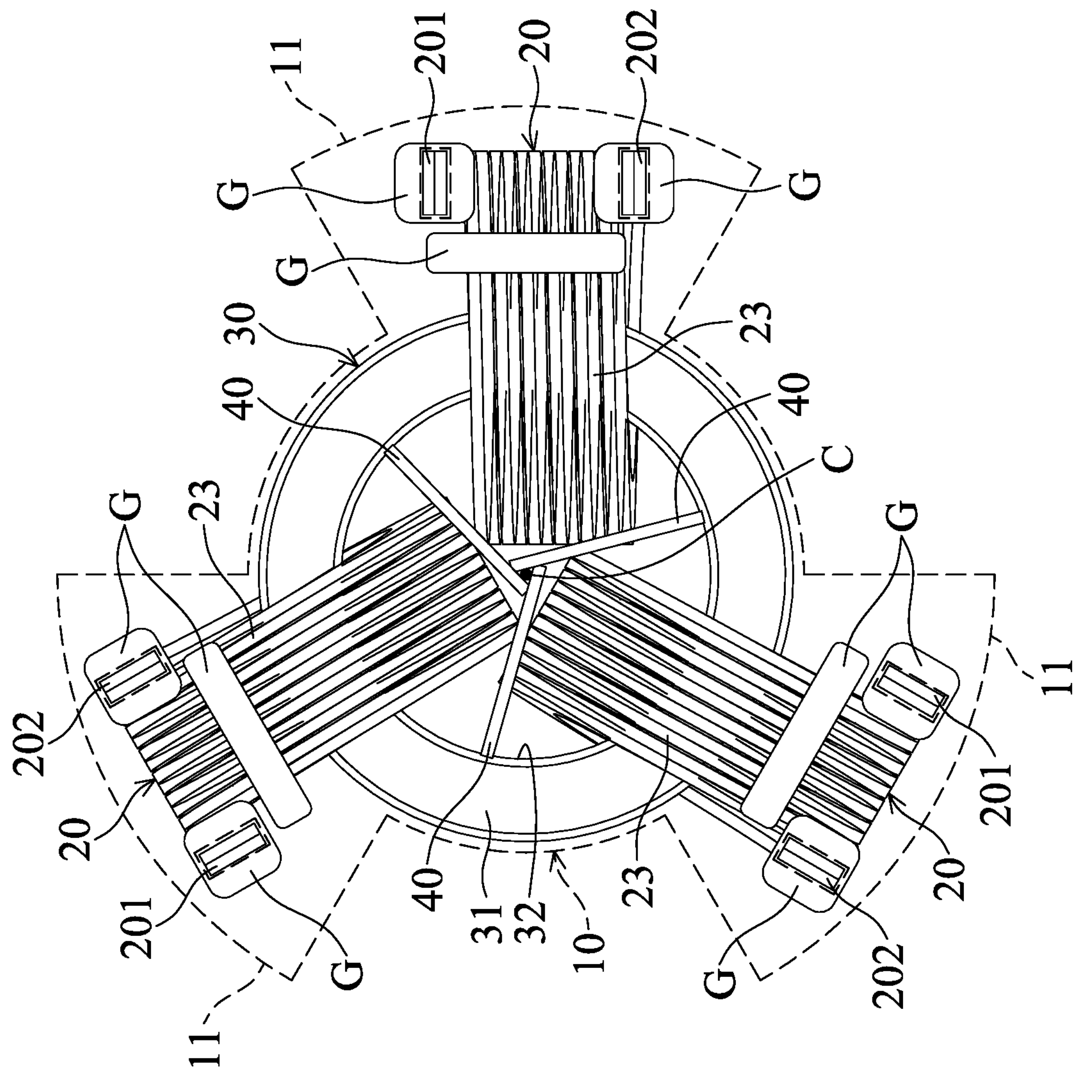
FIG. 9 is a bottom view of the common mode choke 100 in FIGS. 1 and 2, wherein the substrate 10 in FIG. 9 is depicted with broken lines for easy understanding.

FIG. 8 is a top view of the common mode choke 100 in FIGS. 1 and 2. FIG. 9 is a bottom view of the common mode choke 100 in FIGS. 1 and 2, wherein the substrate 10 in FIG. 9 is depicted with broken lines for easy understanding.

As shown in FIGS. 8 and 9, when viewed along the central axis C of the core 30, the opening 32 and the central axis C are located on the inner side of the main body 31, and the first and second ends 201 and 202 of the coils 20 are located on the outer side of the main body 31.

As mentioned above, since all of the first and second ends 201 and 202 are located on the same side (outer side) of the main body 31, the distance between the first and second ends 201 and 202 of each coil 20 can be efficiently reduced. Therefore, the circuit layout of the PCB can be simplified, and complex and long conductive path of the circuit can be avoided to improve efficiency of the common mode choke 100.

For example, the coils 20 may comprise enamelled wires made by copper and/or aluminum. The insulating sheets may be paper sheets, plastic sheets, or other flat members made by insulating material, not limited to the particular embodiments of the invention. Additionally, the core 30 may not be annular in shape. In some embodiments, the core 30 may have a polygonal or oval structure, not limited to the particular embodiments of the invention. Besides, the core 30 may be a ferrite core, but not limited herein.

Figure 10:
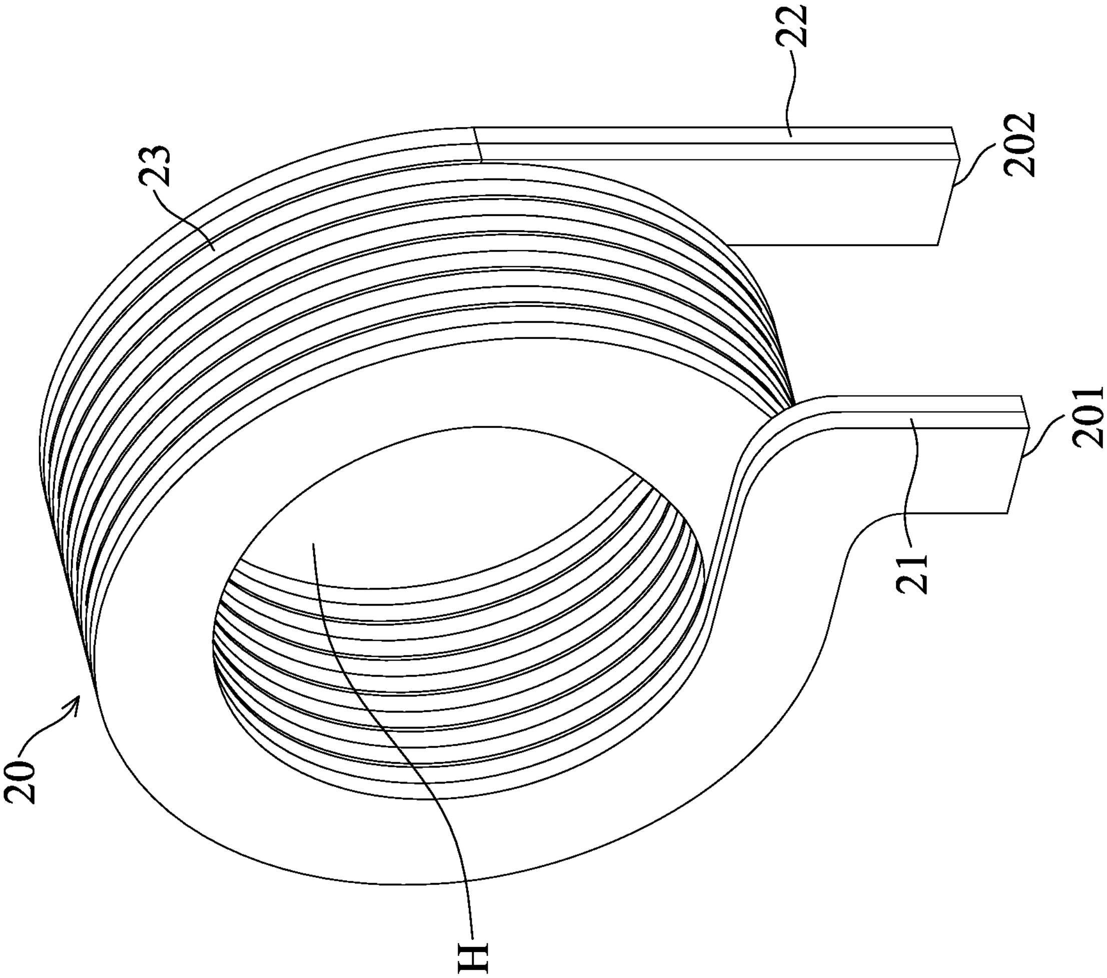
FIG. 10 is a perspective diagram of a coil 20 according to another embodiment of the invention.

FIG. 10 is a perspective diagram of a coil 20 according to another embodiment of the invention. The coil 20 of FIG. 10 is different from FIG. 6 in that the first extending portion 21 has an L-shaped structure. As shown in FIG. 10, the L-shaped structure of the first extending portion 21 extends in a direction parallel to the substrate 10 and then turns in a direction toward the substrate 10.

Figure 11:
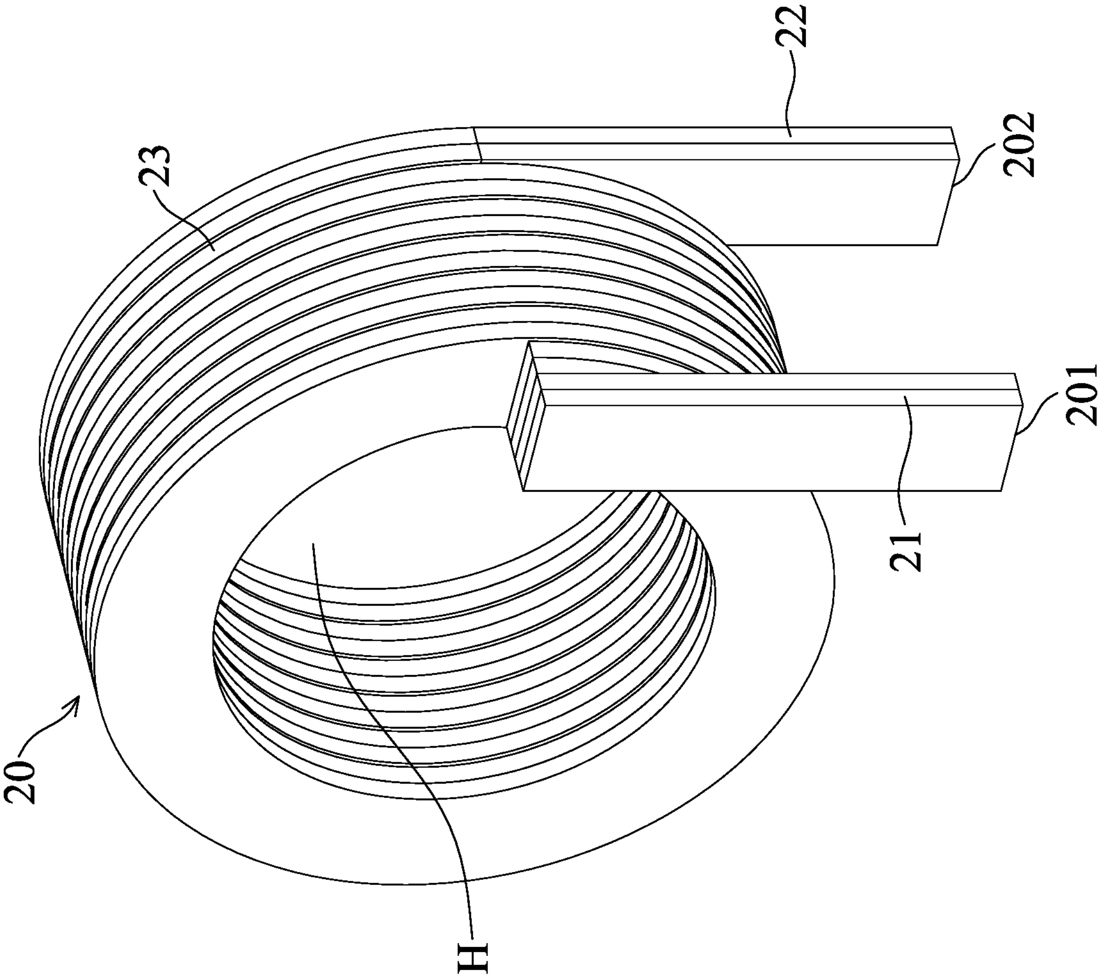
FIG. 11 is a perspective diagram of a coil 20 according to another embodiment of the invention.

FIG. 11 is a perspective diagram of a coil 20 according to another embodiment of the invention. The coil 20 of FIG. 10 is different from FIG. 6 in that the first extending portion 21 has a longitudinal structure (without the U-shaped structure shown in FIG. 6). Referring to FIG. 11, the longitudinal structure of the first extending portion 21 may comprise a copper sheet or other metal conductive sheet welded on a side of the winding portion 23.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A common mode choke, comprising:

a hollow core, having a main body and an opening extending through the main body;

a plurality of coils, extending through the opening and wound around the core, wherein each of the coils has a first end portion and a second end portion; and a substrate, disposed on a side of the core and having a plurality of through holes, wherein the first and second end portions of the coils are respectively engaged in the through holes, a central axis of the core and the opening are located on the inner side of the main body, and the first and second end portions of the coils are located on the outer side of the main body when viewed in a direction parallel to the central axis of the core;

wherein each of the coils further has a first extending portion, a second extending portion, and a winding portion wound around the core, the first extending portion connects the winding portion with the first end portion, and the second extending portion connects the winding portion with the second end portion, wherein the first extending portion has a U-shaped structure that is connected to the winding portion and located on the outer side of the main body, and the first extending portion, the second extending portion and the winding portion constitute a flat enamelled wire.

2. The common mode choke as claimed in claim 1, wherein the coils respectively extend through the through holes.

3. The common mode choke as claimed in claim 2, wherein the first and second end portions of the coils protrude from a bottom surface of the substrate.

4. The common mode choke as claimed in claim 2, wherein the substrate further has a plurality of protrusions arranged in a radial manner, and the through holes are formed on the protrusions.

5. The common mode choke as claimed in claim 1, further comprising a plurality of insulating sheets disposed in the opening and located between the coils.

6. The common mode choke as claimed in claim 5, wherein the insulating sheets are arranged in a radial manner.

7. The common mode choke as claimed in claim 1, wherein the main body of the core has a round, polygonal, or oval structure.

8. The common mode choke as claimed in claim 1, further comprising a plurality of glues disposed between the winding portions of the coils and the substrate.

9. The common mode choke as claimed in claim 1, wherein the core comprises a ferrite core.

* * * * *